US012781001B2

(12) United States Patent
Childers et al.

(10) Patent No.: US 12,781,001 B2
(45) Date of Patent: Nov. 3, 2026

(54) WATER SOLUBLE FILM FOR THERMOFORMING DEEP-DRAWN PROFILES AND THERMOFORMED ARTICLES COMPRISING SAME

(71) Applicant: MONOSOL, LLC, Merrillville, IN (US)

(72) Inventors: Jennifer L. Childers, Lowell, IN (US); David M. Lee, Crown Point, IN (US); Nathanael R. Miranda, Merrillville, IN (US)

(73) Assignee: MONOSOL, LLC, Portage, IN (US)

( * ) Notice: Subject to any disclaimer, the term of this patent is extended or adjusted under 35 U.S.C. 154(b) by 28 days.

(21) Appl. No.: 15/418,318

(22) Filed: Jan. 27, 2017

(65) Prior Publication Data

US 2017/0218146 A1 Aug. 3, 2017

Related U.S. Application Data

(60) Provisional application No. 62/289,179, filed on Jan. 29, 2016.

(51) Int. Cl.
*C08J 5/18* (2006.01)
*B29C 51/00* (2006.01)
(Continued)

(52) U.S. Cl.
CPC ............... *C08J 5/18* (2013.01); *B29C 51/002* (2013.01); *B29C 51/10* (2013.01); *B65D 65/38* (2013.01);
(Continued)

(58) Field of Classification Search
CPC .... B29C 51/10; B29C 51/002; C08J 2300/14; C08J 5/18; C08J 2329/04; C08J 2331/04;
(Continued)

(56) References Cited

U.S. PATENT DOCUMENTS 2,910,728 A * 11/1959 Rowe, Jr. ................ B29C 51/04
264/DIG. 50
7,642,226 B2 * 1/2010 Verrall ...................... C08F 8/44
510/438
(Continued)

FOREIGN PATENT DOCUMENTS

EP 1375637 A1 1/2004
EP 2397539 A1 12/2011
(Continued)

OTHER PUBLICATIONS

International Search Report and Written Opinion, International Application No. PCT/US2017/015394, mailed Apr. 26, 2017.

*Primary Examiner* — Thomas J Kessler
(74) *Attorney, Agent, or Firm* — MARSHALL, GERSTEIN & BORUN LLP

(57) ABSTRACT

The disclosure provides a water soluble film suitable for thermoforming deep-drawn profiles, the film including a mixture of a water soluble polyvinyl alcohol (PVOH) resin and a plasticizer, and the film being characterized by a storage modulus at 90° C. less than $1.5\times10^{8}$. The disclosure further provides a thermoformed article comprising the water soluble film according to the disclosure.

21 Claims, 2 Drawing Sheets

(51) Int. Cl.

| | |
|---|---|
| ***B29C 51/10*** | (2006.01) |
| ***B29K 29/00*** | (2006.01) |
| ***B29K 31/00*** | (2006.01) |
| ***B29L 31/00*** | (2006.01) |
| ***B65D 65/38*** | (2006.01) |
| ***C08K 5/00*** | (2006.01) |
| ***C08K 5/053*** | (2006.01) |
| ***C08L 29/04*** | (2006.01) |
| ***C08L 31/04*** | (2006.01) |
| ***C08L 33/08*** | (2006.01) |
| ***C11D 17/04*** | (2006.01) |

(52) U.S. Cl.
CPC ............ *C08K 5/0016* (2013.01); *C08K 5/053* (2013.01); *C08L 29/04* (2013.01); *C08L 31/04* (2013.01); *C08L 33/08* (2013.01); *C11D 17/042* (2013.01); *C11D 17/045* (2013.01); *B29K 2029/04* (2013.01); *B29K 2031/04* (2013.01); *B29K 2995/0062* (2013.01); *B29L 2031/7128* (2013.01); *C08J 2300/14* (2013.01); *C08J 2329/04* (2013.01); *C08J 2331/04* (2013.01); *C08J 2429/04* (2013.01); *C08J 2433/08* (2013.01); *C08L 2203/16* (2013.01); *C08L 2203/30* (2013.01)

(58) Field of Classification Search
CPC ................ C08J 2429/04; C08J 2433/08; C08J 2300/15; C08K 5/0016; C08K 5/053; C08L 29/04; C08L 31/04; C08L 33/08; C08L 2203/16; C08L 2203/30; C11D 17/042; C11D 17/045; B29K 2029/04; B29K 2031/04; B29K 2995/0062; B29L 2031/7128; B65D 65/38
USPC ........................................................ 206/524.6
See application file for complete search history.

(56) References Cited

U.S. PATENT DOCUMENTS

| | | | | |
|---|---|---|---|---|
| 2005/0028490 | A1 | 2/2005 | Wiedemann et al. | |
| 2009/0291282 | A1* | 11/2009 | Kitamura | C08J 5/18 428/220 |
| 2011/0186467 | A1* | 8/2011 | Denome | B65D 65/46 206/524.7 |
| 2013/0244920 | A1* | 9/2013 | Lee | C11D 3/2093 510/392 |
| 2015/0096130 | A1* | 4/2015 | Bullock | C11D 3/3953 510/276 |
| 2016/0102278 | A1* | 4/2016 | Labeque | C11D 17/045 510/296 |
| 2016/0102279 | A1* | 4/2016 | Labeque | C08K 5/053 510/513 |

FOREIGN PATENT DOCUMENTS

| | | | |
|---|---|---|---|
| JP | 2004-161823 | A | 6/2004 |
| JP | 2004-536748 | A | 12/2004 |
| WO | WO-2006/134657 | A1 | 12/2006 |
| WO | WO-2014/151718 | A2 | 9/2014 |
| WO | WO-2017/043511 | A1 | 3/2017 |

* cited by examiner

WATER SOLUBLE FILM FOR THERMOFORMING DEEP-DRAWN PROFILES AND THERMOFORMED ARTICLES COMPRISING SAME

FIELD OF THE INVENTION

The present disclosure relates generally to water soluble films and related articles. More particularly, the disclosure relates to water soluble films suitable for thermoforming deep-drawn profiles and thermoformed articles comprising same.

BACKGROUND

Water soluble polymeric films are commonly used as packaging materials to simplify dispersing, pouring, dissolving and dosing of a material to be delivered. For example, pouches made from water soluble film are commonly used to package household care compositions such as laundry or dish detergent. A consumer can directly add the pouched composition to a mixing vessel, such as a bucket, sink or washing machine. Advantageously, this provides for accurate dosing while eliminating the need for the consumer to measure the composition. The pouched composition may also reduce mess that would be associated with dispensing a similar composition from a vessel, such as pouring a liquid laundry detergent from a bottle. In sum, soluble pre-measured polymeric film pouches provide for convenience of consumer use in a variety of applications.

Soluble unit doses (SUDS) can be designed to include multiple cavities, with each cavity having its own shape and size. Some commercial water soluble films demonstrate inadequate performance in more complicated unit dose designs, for example, in unit doses having deep box-like cavities. Thus, there exists a need in the art for a water soluble film suitable for thermoforming deep-drawn profiles, e.g. for use in water soluble single dose packaging.

SUMMARY

One aspect of the disclosure provides a water soluble film suitable for thermoforming deep-drawn profiles, the film comprising a mixture of a water soluble polyvinyl alcohol resin and a plasticizer, wherein the water soluble polyvinyl alcohol resin comprises a polyvinyl acetate co-maleate copolymer and the water soluble polyvinyl alcohol resin has a viscosity in a range of about 14 cP to about 20 cP.

Another aspect of the disclosure provides a water soluble film suitable for thermoforming deep-drawn profiles, the film comprising a mixture of a water soluble polyvinyl alcohol (PVOH) resin and a plasticizer, and the film being characterized by a storage modulus at 90° C. less than $1.5\times10^{8}$.

Another aspect of the disclosure provides a thermoformed article comprising the water soluble film according to the disclosure.

Another aspect of the disclosure provides a thermoformed article comprising the water soluble film according to the disclosure, wherein the article is characterized by a draw ratio of at least 2.5.

Another aspect of the disclosure provides a thermoformed article comprising the water soluble film according to the disclosure, wherein the article comprises at least two thermoformed cavities, each cavity comprising walls, corners, and a bottom.

Another aspect of the disclosure is a thermoformed pouch comprising the water soluble film of the disclosure.

Another aspect of the disclosure is a method of making a shape from a water soluble film comprising thermoforming a water soluble film according to the disclosure.

For the compositions and methods described herein, optional features, including but not limited to components, compositional ranges thereof, substituents, conditions, and steps are contemplated to be selected from the various aspects, embodiments, and examples provided herein.

Further aspects and advantages will be apparent to those of ordinary skill in the art from a review of the following detailed description, taken in conjunction with the drawings. While the film, article, pouch, and their methods of making are susceptible of embodiments in various forms, the description hereafter includes specific embodiments with the understanding that the disclosure is illustrative, and is not intended to limit the invention to the specific embodiments described herein.

BRIEF DESCRIPTION OF THE DRAWINGS

For further facilitating the understanding of the present invention, two drawing figures are appended hereto.

DETAILED DESCRIPTION

Figure 1:
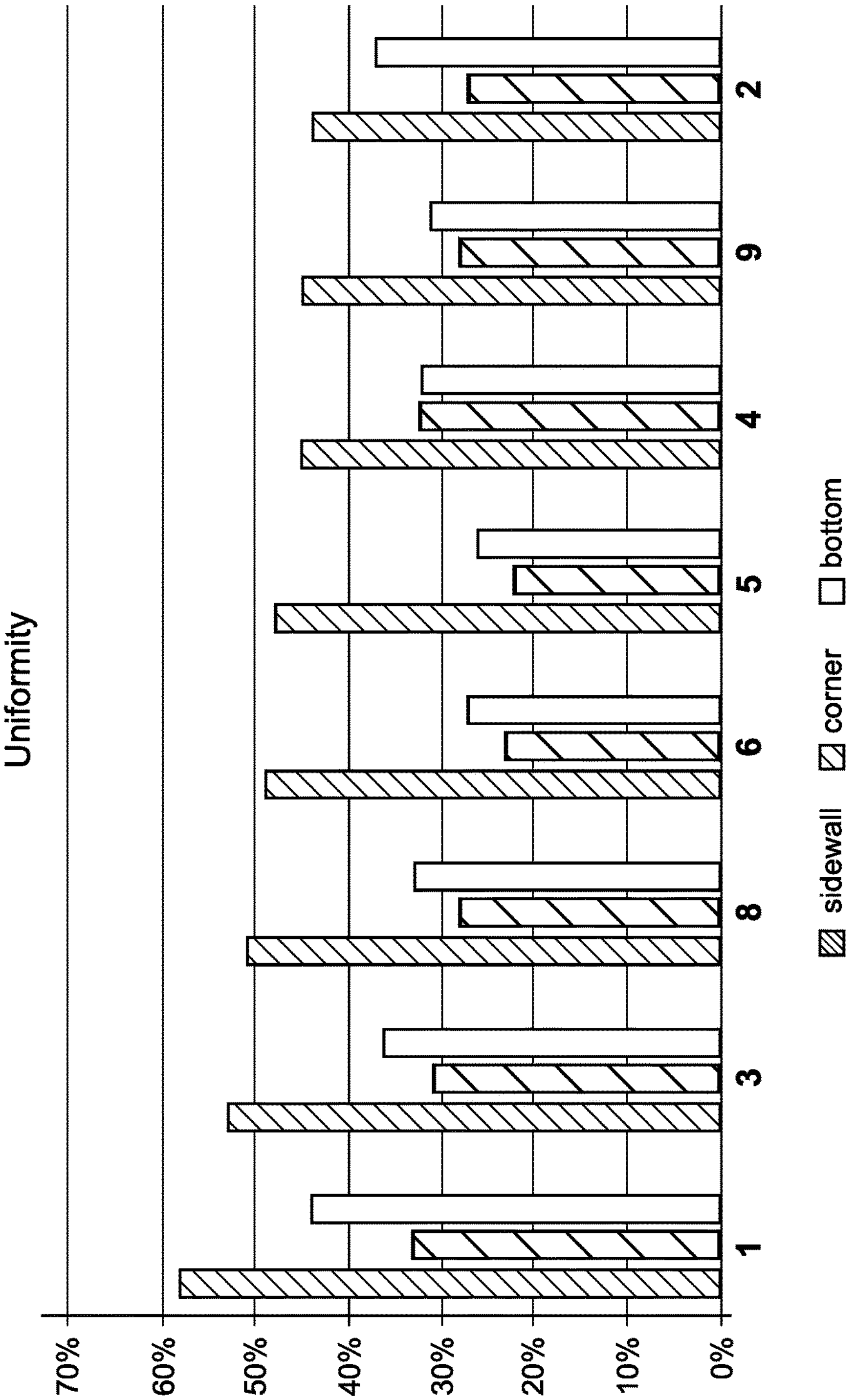
FIG. 1 shows a graphical representation of the thickness uniformity in various thermoformed films.

One aspect of the disclosure provides a water soluble film suitable for thermoforming deep-drawn profiles, the film comprising a mixture of a water soluble polyvinyl alcohol (PVOH) resin and a plasticizer, wherein the water soluble polyvinyl alcohol resin comprises a polyvinyl acetate co-maleate copolymer and the water soluble polyvinyl alcohol resin has a viscosity in a range of about 14 cP to about 20 cP. In some embodiments, the water soluble polyvinyl alcohol resin comprises a blend of the polyvinyl acetate co-maleate copolymer and a second polyvinyl alcohol polymer. Optionally, the second polyvinyl alcohol polymer may be selected from the group consisting of polyvinyl acetate co-methyl acrylate copolymers, polyvinyl alcohol homopolymers, and mixtures thereof. In embodiments, the polyvinyl acetate co-maleate copolymer includes at least 2 mol % maleate modification.

As used herein, "polyvinyl acetate co-[monomer] copolymer" encompasses non-hydrolyzed polyvinyl acetate copolymers (i.e., a true copolymer of vinyl acetate monomer units and co-monomer (e.g., maleate) units), partially hydrolyzed polyvinyl acetate copolymers (i.e., a terpolymer including vinyl acetate monomer units, vinyl alcohol monomer units, and the co-monomer (e.g., maleate) units), and fully hydrolyzed polyvinyl acetate copolymers (i.e., a true copolymer including vinyl alcohol monomer units and the co-monomer (e.g., maleate) units).

In some embodiments, the PVOH resin comprises at least 9 mol % total non-hydroxyl pendant groups.

As used herein, "non-hydroxyl pendant groups" includes pendant groups that are introduced through modification of a typical polyvinyl alcohol backbone (e.g. copolymerization of vinyl acetate with anionic monomers) as well as acetate pendant groups that have not been hydrolyzed into hydroxyl groups, but does not include the hydroxyl groups that result from the hydrolysis of vinyl acetate. For example a methyl acrylate monomer contributes 1 pendant group and a maleic monomer contributes 2 pendant groups. Thus, a PVOH copolymer having 1 mole % acetate groups (99 mole % hydrolyzed), 1 mole % methyl acrylate, and 1 mole % monomethyl maleate would have a total amount of pendant groups of 4 mole %.

Another aspect of the disclosure provides a water soluble film suitable for thermoforming deep-drawn profiles, the film comprising a mixture of a water soluble polyvinyl alcohol (PVOH) resin and a plasticizer, and the film being characterized by a storage modulus at 90° C. less than $1.5\times10^8$. In some embodiments, the water soluble film can have a storage modulus at 35° C. of at least $1\times10^8$. As used herein and unless specified otherwise, the storage modulus of the film is provided in Pascals (Pa). In some embodiments, the water soluble film can be characterized by a ratio of its storage modulus at 35° C. to its storage modulus at 90° C. of at least 4.5. In some embodiments, the water soluble film can be characterized by a ratio of its storage modulus at 35° C. to its storage modulus at 90° C. less than 8. In some embodiments, the PVOH resin of the films of the disclosure comprises at least 3.5 mol % total non-hydroxyl pendant groups and, optionally, at least 3 mol % pendant anionic groups. In some embodiments, the PVOH resin of the films of the disclosure can be characterized by a viscosity in a range of about 12 cP to about 23 cP.

Another aspect of the disclosure provides a thermoformed article comprising the water soluble film according to the disclosure. In some embodiments, the article can be characterized by a draw ratio of at least 2.5. In some embodiments, the article includes a thermoformed cavity comprising walls, corners, and a bottom, and the article can be characterized by a draw ratio of at least 3.5, and the average thermoformed film thickness measured at the center the side walls is at least 55% of the original film thickness. In some embodiments, the article includes a thermoformed cavity comprising walls, corners, and a bottom, and the article can be characterized by a draw ratio of at least 3.5, and the average thermoformed film thickness measured near the bottom edge of the side wall is at least 29% of the original film thickness In some embodiments, the article includes a thermoformed cavity comprising walls, corners, and a bottom, and the article can be characterized by a draw ratio of at least 3.5 and the thermoformed film thickness at the bottom wall is at least 37% of the original film thickness. In some embodiments, the article includes a thermoformed cavity comprising walls, corners, and a bottom, and the article can be characterized by a draw ratio of at least 3.5 and the thermoformed film thickness at the bottom wall is at least 28% of the original film thickness. In some embodiments, the article includes a thermoformed cavity comprising walls, corners, and a bottom, and the article can be characterized by a draw ratio of at least 3.5, and the average thermoformed film thickness in at least two regions selected from corners, side walls, and bottom is at least 40% of the original thickness. In some embodiments, the article includes a thermoformed cavity comprising walls, corners, and a bottom, and the article can be characterized by a draw ratio of at least 3.5 and the thermoformed film thickness at the corner wall is at least 27% of the original film thickness. Optionally the article is vacuum-formed.

Another aspect of the disclosure is a thermoformed article comprising the water soluble film according to the disclosure, wherein the article comprises at least two thermoformed cavities, each cavity comprising walls, corners, and a bottom.

Another aspect of the disclosure is a thermoformed pouch comprising the water soluble film of the disclosure. As used herein, unless specified otherwise, "pouch," "packet," and "sachet" may be used interchangeably.

Another aspect of the disclosure is a method of making a shape from a water soluble film comprising thermoforming a water soluble film according to the disclosure. In some embodiments, the method comprises vacuum thermoforming the water soluble film. Optionally, the method can include heating the water soluble film to a temperature in a range of about 50 to about 150° C. In some embodiments, thermoforming comprises a thermoforming mold comprising at least two cavities.

As used herein, unless specified otherwise, "deep-drawn profiles" refer to a profile having a draw ratio of at least 2.5.

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. For example, a thermoformed packet can "consist essentially of" a film described herein for use of it thermoforming characteristics, while including a non-thermoformed film (e.g., lid portion), and optional markings on the film, e.g. by inkjet printing. The invention illustratively disclosed herein suitably may be practiced in the absence of any element or step which is not specifically disclosed herein.

Films, such as those made in accordance with the disclosure, are defined by the polymer industry (Encyclopedia of Polymer Science and Technology, John Wiley & Sons, Inc., 1967, Vol. 6, page 764) as "shaped plastics that are comparatively thin in relation to their breadth and width and have a maximum thickness of 0.010 in."

Self-supporting films are those capable of supporting their own weight. Uniform films refer to those which are virtually free of breaks, tears, holes, bubbles, and striations.

To be considered a water-soluble film according to the present disclosure, the film, at a thickness of about 1.5 mil (about 0.038 mm), dissolves in 300 seconds or less in water at a temperature of 20° C. (68° F.) in accordance with MonoSol Test Method MSTM-205.

All percentages, parts and ratios are based upon the total dry weight of the formed film composition and all measurements are made at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

The dimensions and values disclosed herein are not to be understood as being strictly limited to the exact numerical values recited. Instead, unless otherwise specified, each such dimension is intended to include both the recited value and a functionally equivalent range surrounding that value. For example, a dimension disclosed as "15 mm" is intended to include "about 15 mm," and "about 15 mm" can include a range of from 14.5 mm to 15.4 mm, e.g. by numerical rounding.

As used herein and unless specified otherwise, the terms "wt. %" and "wt %" are intended to refer to the composition of the identified elements in "dry" (non water) parts by weight of the entire film (when applicable or parts by weight of the entire composition enclosed within a pouch (when applicable). As used herein and unless specified otherwise, the term "PHR" is intended to refer to the composition of the identified element in parts per one hundred parts water soluble polymer (or resin; whether polyvinyl alcohol or otherwise) in the water soluble film.

As described below, the film described herein surprisingly provides excellent ability to be converted into a deep drawn pouch or article using automated equipment (formability). Good film formability can be determined by one or more factors including (a) the film thicknesses of each of the thermoformed article regions (e.g., walls, corners, and bottom of a thermoformed shape) are maximized (i.e., less thinned out, compared to the original film thickness pre-thermoforming); (b) the film follows the form of the cavity smoothly and uniformly (e.g., walls, corners, and bottom of the cavity); and (c) the thermoformed article regions (e.g., walls, corners, and bottom of a thermoformed shape) are more uniform in thickness; and (d) lack or minimization of defects (e.g. lack of folding or creasing in what is intended to be a smooth surface in the thermoformed shape). Films were thermoformed as described below, and characterized by measuring the film thicknesses and storage modulus according to the test methods described below.

The film can be made by a solution casting method. The film can be used to form an article or a pouch by any suitable process, including thermoforming and, for example, solvent sealing or heat sealing of film layers around a periphery of the article. The pouches can be used for dosing materials to be delivered into bulk water, for example.

The films, articles, pouches, and related methods of making and use are contemplated to include embodiments including any combination of one or more of the elements, features, and steps further described below (including those shown in the Examples and figures), unless stated otherwise.

Water Soluble Films

Unit dose design, including the number of cavities and the shape and size of the cavities, can be used to differentiate and gain advantage over commercial single use dosages (SUDS). The formability of the film used to prepare SUDS becomes more important as the depth of the cavity increases, the number of cavities increases, and the shape of the cavities becomes more box-like and less oval. The films of the disclosure can be designed to perform in complicated unit dose designs and have one or more advantages such as formability into deep-drawn profiles and/or box-like profiles. The film and related articles and pouches described herein can comprise a plasticized, solution-cast, water soluble film. The films optionally further include one or more additives selected from fillers, surfactants, anti-block agents, antioxidants, antifoams, bleaching agents, aversive agents, pungents, other functional ingredients, and combinations of the foregoing. In one aspect, the water soluble film can comprise a total of at least about 50 wt % of a PVOH resin comprising one or more PVOH polymers that optionally includes a PVOH copolymer.

The storage modulus of a water soluble film describes the stiffness of the film at a given temperature. Generally, the storage modulus of a film increases, or at least stays constant, as the temperature decreases. Films of the disclosure can be characterized based on the storage modulus of the film at 90° C. as well as the ratio of the storage modulus at 35° C. to the storage modulus of the same film at 90° C. ("storage modulus ratio" or "SMR"). For water soluble for thermoforming deep drawn profiles, lower storage modulus at 90° C. are desired. Optionally, higher SMR ratios can be desirable. Without intending to be bound by theory, it is believed that storage modulus is dominated by the viscosity of the resin and the plasticizer loading. In particular, as viscosity increases so does the storage modulus; as the plasticizers level increases the storage modulus decreases—that is, the film is plasticized.

In some embodiments, the water soluble film of the disclosure can be characterized by a storage modulus at 90° C. less than $1.5\times10^8$. In some embodiments, the water soluble film of the disclosure can be characterized by a storage modulus at 90° C. of $1.25\times10^8$ or less. In some embodiments, the water soluble film of the disclosure can be characterized by a storage modulus at 90° C. of $9\times10^7$ or less. In some embodiments, the water soluble film of the disclosure can be characterized by a storage modulus at 90° C. of at least $1\times10^7$. In some embodiments, the water soluble film of the disclosure can be characterized by a storage modulus at 35° C. of at least $1\times10^8$. In some embodiments, the water soluble film of the disclosure can be characterized by a ratio of its storage modulus at 35° C. to its storage modulus at 90° C. (SMR). The SMR can be at least 4.5, or at least 5, or at least 5.5, or at least 6 or less than 8, or less than 7, or in a range of 4.5 to 8, or 5 to 7, for example 4.5, or 5, or 5.5, or 6, or 6.5, or 7, or 7.5, or 8.

Without intending to be bound by theory, it is believed that a moderately-low viscosity resin, as described below, allows for easier flow of the polymer molecules at thermoforming temperatures (e.g. 12 cP to 23 cP, or about 14 cP to about 20 cP). However, the viscosity of the resin should not be so low that there is insufficient viscosity to create physically strong and robust soluble unit doses. Further, without intending to be bound by theory, it is believed that a higher the level of non-hydroxyl pendant groups, as described below, whether non-ionic (e.g. acetate) or ionic (e.g. anionic), disrupts the hydrogen bonding of the polymer chain thereby facilitating easier movement of the polymer molecules at the thermoforming temperatures. However, the level of total non-hydroxyl pendant groups should not be so high that the PVOH is too easily dissolved to allow for handling by wet hands or unduly sensitive to humidity variations particularly during the conversion process, as it is recognized by those skilled in the art that moisture absorbed from the air can act as a film plasticizer. Further still, without intending to be bound by theory, it is believed that a sufficiently high level of surfactant that will migrate to the film surface, as described below, acts as slip (friction reduction) agent as the film draws or flows along the thermoforming cavity. However, the amount of surfactant should not be so high that the resulting film has too much surfactant on the surface and the film no longer is capable of forming suitable polymer-polymer (PVOH-PVOH) seals, either during heat sealing or water sealing processes.

The film can have any suitable thickness, and a film thickness of about 76 microns (μm) is typical and particularly contemplated. Other values and ranges contemplated include values in a range of about 5 to about 200 μm, or in a range of about 20 to about 100 μm, or about 60 to about 120 μm, or about 70 to about 100 μm, or about 40 to about 90 μm, or about 50 to about 80 μm, or about 60 to about 65

μm for example 65 μm, 76 μm, 88 μm, or 90 μm. The storage modulus of the film is independent of the thickness of the film over the disclosed ranges. Without intending to be bound by theory, it is believed the storage modulus may be influenced by secondary effects, e.g., artifacts from heat transfer, but for the purpose of the present application the above range of thicknesses is suitable for uses in the creation of thermoformed articles and/or pouches.

PVOH Resins

The film described herein includes one or more polyvinyl alcohol (PVOH) polymers to make up the PVOH resin content of the film, and can include a PVOH copolymer resin.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is, the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as homopolymer PVOH.

In particular, the PVOH resin will include a partially or fully hydrolyzed PVOH copolymer that includes an anionic monomer unit, a vinyl alcohol monomer unit, and optionally a vinyl acetate monomer unit. In various embodiments, the anionic monomer can be one or more of vinyl acetic acid, alkyl acrylates, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, citraconic acid, monoalkyl citraconate, dialkyl citraconate, citraconic anhydride, mesaconic acid, monoalkyl mesaconate, dialkyl mesaconate, mesaconic anhydride, glutaconic acid, monoalkyl glutaconate, dialkyl glutaconate, glutaconic anhydride, vinyl sulfonic acid, alkyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations of the foregoing (e.g., multiple types of anionic monomers or equivalent forms of the same anionic monomer). For example, the anionic monomer can include one or more of monomethyl maleate and alkali metal salts thereof (e.g. sodium salts).

In one type of embodiment, the PVOH is a carboxyl group modified copolymer. In another aspect, the PVOH can be modified with a dicarboxyl type monomer. In one class of these embodiments, the α carbon of the carbonyl is contacted to the unsaturated bond (e.g., maleic acid, fumaric acid). In another class of these embodiments, the α carbon of the carbonyl is contacted to the unsaturated bond with a methyl branch (e.g., citraconic acid, mesaconic acid). In another class of these embodiments, the β carbon of the carbonyl is contacted to the unsaturated bond (e.g., itaconic acid, cis-glutaconic acid, trans-glutaconic acid). Monomers that provide alkyl carboxyl groups are contemplated. A maleate type (e.g., dialkyl maleate, including monomethyl maleate) comonomer is particularly contemplated.

In embodiments, the polyvinyl alcohol resin comprises a polyvinyl acetate co-maleate copolymer. In refinements of the foregoing embodiments, the polyvinyl acetate co-maleate copolymer may include one or more monomer units selected from maleic acid, monoalkyl maleate, dialkyl maleate, maleic anyhydride, and alkali metal salts thereof. The polyvinyl acetate co-maleate copolymer may be a partially or fully hydrolyzed copolymer of polyvinyl acetate and maleic anhydride. In embodiments, the polyvinyl acetate co-maleate includes at least 2 mol % maleate modification and up to about 8 mol % maleate modification, for example, about 2 mol %, about 2.4 mol %, about 2.5 mol %, about 2.8 mol %, about 3 mol %, about 3.2 mol %, about 3.6 mol %, about 4 mol %, about 5 mol %, about 6 mol %, about 7 mol %, or about 8 mol %.

In embodiments when the polyvinyl alcohol resin comprises a blend of polyvinyl alcohol polymers or copolymers, at least one of the polyvinyl alcohol polymers may comprise a polyvinyl acetate co-maleate copolymer. In embodiments, the blend of polyvinyl alcohol polymers may further include polyvinyl acetate co-methyl acrylate, polyvinyl alcohol homopolymer, and combinations thereof. In embodiments, the polyvinyl alcohol resin comprises a blend of polyvinyl acetate co-maleate copolymer and polyvinyl acetate co-methyl acrylate copolymer. In embodiments, the polyvinyl alcohol resin comprises a blend of polyvinyl acetate co-maleate copolymer and polyvinyl alcohol homopolymer. In embodiments wherein the polyvinyl alcohol resin comprises a blend of PVOH polymers including polyvinyl acetate co-maleate copolymers, the PVOH resin blend may have an arithmetic weighted average amount of maleate groups of at least about 2 mol % maleate modification and up to about 8 mol % maleate modification, for example, about 2 mol %, about 2.4 mol %, about 2.5 mol %, about 2.8 mol %, about 3 mol %, about 3.2 mol %, about 3.6 mol %, about 4 mol %, about 5 mol %, about 6 mol %, about 7 mol %, or about 8 mol %. The arithmetic weighted average of the modification $\overline{m}$ is calculated by the formula $\overline{m}=\Sigma(W_i \cdot m_i)$ wherein $W_i$ is the weight percentage of the respective PVOH copolymer and $m_i$ is the respective mol % of modification in the PVOH copolymer.

The PVOH resins can be characterized by the total amount of non-hydroxyl pendant groups present in the resin. The total amount of non-hydroxyl pendant groups includes vinyl acetate groups that are not hydrolyzed as well as pendant groups introduced through anionic monomers. Thus, the total non-hydroxyl pendant groups arise from the sum of the mole % of non-hydroxyl pendant groups on the PVOH polymer. For example a methyl acrylate monomer contributes 1 pendant group and a maleic monomer contributes 2 pendant groups. Thus, a PVOH copolymer having 1 mole % acetate groups, 1 mole % methyl acrylate, and 1 mole % monomethyl maleate would have a total amount of pendant groups of 4 mole %.

The total non-hydroxyl pendant groups in the PVOH resin can be in a range of 3 to 50 mole %, or 5 to 40 mole %, or 7 to 30 mole %, or 10 to 20 mole %, or at least 3.5 mole %, or at least 11.5 mole %, or at least 16 mole %, for example 3 mol %, 3.5 mole %, 4 mole %, 4.5 mole %, 5 mole %, 5.5 mole %, 6 mole %, 6.5 mole %, 7 mole %, 7.5 mole %, 8 mole %, 8.5 mole %, 9 mole %, 9.5 mole %, 10 mole %, 10.5 mole %, 11 mole %, 11.5 mole %, 12 mole %, 12.5 mole %, 13 mole %, 13.5 mole %, 14 mole %, 14.5 mole %, 15 mole %, 15.5 mole %, 16 mole %, 16.5 mole %, 17 mole %, 17.5 mole %, 18 mole %, 18.5 mole %, 19 mole %, 19.5 mole %, or 20 mole %.

In one type of embodiment, if the total non-hydroxyl pendant groups are greater than about 40 mole % then the total mole % nonionic groups above 40 mole % will have at least one balancing ionic group. For example, 41 mole % of non-hydroxyl pendant groups can be made up of 40 mole % nonionic pendant groups plus 0.5 mole % nonionic pendant groups plus 0.5 mole % ionic pendant groups. In another example, 42 mole % of non-hydroxyl pendant groups can be made up of 40 mole % nonionic pendant groups plus 1 mole % nonionic pendant groups plus 1 mole % ionic pendant groups, and so on up to 50 mole % of non-hydroxyl pendant groups.

In another aspect, the PVOH resin can be characterized by the number of pendant anionic groups. The amount of inclusion of pendant anionic groups can be in a range of 1 mole % to 20 mole %, or 1.5 to 8 mole %, or 2 to 12 mole %, or 2 to 10 mole %, or at least 3 mole %, or at least 3.5 mole %, for example 2%, 3%, 6%, 8%, 9%, or 10%. The PVOH resin blend may have an arithmetic weighted average amount of pendant groups (P) in a range of about 2 mol % to about 10 mol %. That is, the first pendant group and the second pendant group together are present in a combined amount in a range of about 1 mole % to 20 mole %, or 1.5 to 8 mole %, or 2 to 12 mole %, or 2 to 10 mole %, or 9 mol % to about 20 mol %. The arithmetic weighted average of the pendant groups $\overline{P}$ is calculated by the formula $\overline{P}=\Sigma(W_i \cdot P_i)$ wherein $W_i$ is the weight percentage of the respective PVOH copolymer and $P_i$ is the respective mol % of pendant groups in the PVOH copolymer.

Without intending to be bound by theory, it is believed that the non-hydroxyl pendant groups, whether nonionic or anionic, reduce the hydrogen bonding interaction of the PVOH polymer in the film, allowing for easier flow of the molecules during the drawing stage of the film into the deep draw cavity. It was surprisingly found that the dependency of the storage modulus at 35° C. on the total non-hydroxyl pendant groups is less than the dependency of the storage modulus at 90° C., creating a positive correlation of the storage modulus ratio (SMR) to the total amount of pendant groups.

The amount of PVOH resin in the film can be in a range of about 55 to about 95% by weight based on the total weight of the film, or about 60% to 90%, or about 65% to about 85%, for example.

The total PVOH resin content of the film can have a degree of hydrolysis (D.H. or DH) of at least 80%, 84%, or 85% and at most about 99.7%, 98%, or 96%, for example in a range of about 84% to about 90%, or 85% to 88%, or 86.5%, or in a range of 85% to 99.7%, about 88% to 98%, or 90% to 96%, for example, 91%, 92%, 93%, 94%, 95%, or 96%. As used herein, the degree of hydrolysis is expressed as a mole percentage of vinyl acetate units converted to vinyl alcohol units.

The degree of hydrolysis of a resin blend can also be characterized by the arithmetic weighted, average degree of hydrolysis ($\overline{H^{\circ}}$). For example, $\overline{H^{\circ}}$ for a PVOH resin that comprises two or more PVOH polymers is calculated by the formula $\overline{H^{\circ}}=\Sigma(Wi \cdot H_i)$ where $W_i$ is the weight percentage of the respective PVOH polymer and H, is the respective degrees of hydrolysis.

The viscosity of a PVOH polymer (μ) is determined by measuring a freshly made solution using a Brookfield LV type viscometer with UL adapter as described in British Standard ENISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

Without intending to be bound by theory, it is believed that lower viscosity (molecular weight) of the PVOH allows easier molecular movement at 90° C. and therefore easier flow of the film in deep cavities. The dependency of storage modulus at 35° C. (SM35) on the resin viscosity is less strong than that of the storage modulus at 90° C. (SM90) on the resin viscosity and therefore results in an inverse relationship of that storage modulus ratio (SMR). Without intending to be bound by theory, it is believed that the lower viscosity of the PVOH resins allows for greater chain mobility at any given temperature; upon cooling and stress relaxation after the thermoforming step the lower molecular weight PVOH polymer can more easily move into a preferred conformation of packing and hydrogen bonding resulting in a higher SM35. It is recognized that this trend cannot continue to "zero" viscosity and therefore the PVOH resin, or combination of one or more PVOH resins, provided in the water soluble film can have a mean viscosity of at least about 10 cP, or least about 12 cP, or least about 13 cP, or least about 14 cP, or least about 15 CP, or least about 16 cP and at most about 23 cP, or at most about 22 cP, or at most about 21 cP, or at most about 20 cP, or at most about 19 cP, or at most about 18 cP, for example in a range of about 12 cP to about 23 cP, or about 14 cP to about 20 cP, or about 16 cP to about 18 cP. If the PVOH resin part of the film is a combination of one or more resins, then the combination can have a mean viscosity corresponding to the values and ranges just described, e.g. by weight averaging of the individual component viscosity values. In another type of embodiment, the combination of PVOH resins (in their intended ratios) can be made up as a 4% aqueous solution and have its viscosity measured. Suitable PVOH resins, for use individually or in combinations, can have viscosities in a range of about 1 cP to about 40 cP, or about 5 cP to about 38 cP, or about 10 cP to about 36 cP, or about 12 cP to about 34 cP, or about 14 cP to about 32 cP, for example 32 cP, 23 cP, or 20 cP, or 16.5 cP. It is well known in the art that the viscosity of PVOH resins is correlated with the weight average molecular weight ($\overline{Mw}$) of the PVOH resin, and often the viscosity is used as a proxy for the $\overline{Mw}$. When referring to the viscosity of a PVOH resin comprising a PVOH polymer blend, the weighted natural log average viscosity ($\overline{\mu}$) is used. The $\overline{\mu}$ for a PVOH resin that comprises two or more PVOH polymers is calculated by the formula $\overline{\mu}=e^{\Sigma W_i \cdot ln\ \mu_i}$ where $\mu_i$ is the viscosity for the respective PVOH polymers.

Other water soluble polymers for use in addition to the PVOH copolymer in the film can include, but are not limited to a vinyl alcohol-vinyl acetate copolymer, sometimes referred to as a PVOH homopolymer, polyacrylates, water soluble acrylate copolymers, polyvinyl pyrrolidone, polyethyleneimine, pullulan, water soluble natural polymers including, but not limited to, guar gum, gum Acacia, xanthan gum, carrageenan, pectin, amylopectin, alginic acid and salts thereof, and starch, water soluble polymer derivatives including, but not limited to, modified starches, ethoxylated starch, and hydroxypropylated starch, copolymers of the forgoing and combinations of any of the foregoing. Yet other water soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water soluble polymers, whether PVOH or otherwise, are commercially available from a variety of sources.

Plasticizers

A plasticizer is a liquid, solid, or semi-solid that is added to a material (usually a resin or elastomer) making that material softer, more flexible (by decreasing the glass-transition temperature of the polymer), and easier to process. At low plasticizer levels, films may become brittle, difficult to process, or prone to breaking. At elevated plasticizer levels, films may be too soft, weak, or difficult to process for a desired use.

The plasticizer can include, but is not limited to, glycerol, diglycerol, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane (TMP), polyether polyols, 2-methyl-1,3-propanediol (e.g. MP Diol®), ethanolamines, and mixtures thereof. In some embodiments, the plasticizer is selected from glycerol, diglycerol, propylene glycol, ethylene glycol, diethylene glycol, polyethylene glycols up to MW 400, sorbitol, 2-methyl-1,3-propanediol, trimethylolpropane, polyether polyols, and combinations of the foregoing. In one type of embodiment, the plasticizer includes glycerol, propylene glycol, sorbitol, 2-methyl-1,3-propanediol and combinations of the foregoing. In another one type of embodiment, the plasticizer includes glycerol, propylene glycol, sorbitol, trimethylolpropane, and combinations of the foregoing.

The storage modulus of the water soluble film at 35° C. and 90° C. is inversely related to the level of plasticizer included in the film. However, the level of plasticizer cannot merely be increased until the resulting film has a desired storage modulus, due to the potential for over plasticization. One of ordinary skill in the art will appreciate that over plasticization of a film can occur when the plasticizer level in the film is too high, leading to undesirable properties such as surface "sweating" and greasiness, an unacceptable feel to the hand of the consumer, and even blocking of the film on a roll or in stacks of sheets. Thus, the amount of plasticizer in the film should be selected to decrease the storage modulus of the film without adversely over plasticizing the film. One of ordinary skill in the art will appreciate that a lower viscosity resin-based film will require less plasticizer than a moderate or high viscosity resin-based film.

The total amount of the plasticizer can be in a range of about 10 wt. % to about 45 wt. %, or about 13 wt. % to about 35 wt. %, or about 16 wt. % to about 30 wt. %, or about 18 wt. % to about 25 wt. %, for example about 18 wt. %, or about 19 wt. %, or about 20 wt. %, or about 21 wt. %, or about 22 wt. %, or about 23 wt. %, or about 24 wt. %, or about 25 wt. %, based on total film weight. The total amount of the plasticizer can also be characterized in parts per hundred parts resin (PHR). The total amount of plasticizer can be in a range of about 12 to about 60 PHR, or about 18 to about 50 PHR, or about 20 to about 45 PHR, or about 24 to about 40 PHR, for example, about 24 PHR, about 25 PHR, about 26 PHR, about 27 PHR, about 30 PHR, about 32 PHR, about 34 PHR, about 36 PHR, about 38 PHR, or about 40 PHR.

Auxiliary Film Ingredients

The water soluble film can contain other auxiliary agents and processing agents, such as, but not limited to, surfactants, lubricants, release agents, fillers, extenders, cross-linking agents, antiblocking agents, antioxidants, detackifying agents, antifoams (defoamers), nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes.

Without intending to be bound by theory, it is believed that SM35 and SM90 are positively correlated with the level of surfactant provided in the film formulation. While this may be unfavorable in the SM90 it is favorable in SM35. Without intending to be bound by theory, it is believed that the surfactants are acting as internal mold releases or flow lubricants. In particular, it is believed that because surfactants are surface active they can (e.g. at elevated temperature) migrate to the surface of the film and aid in the flow/slip of the film over the metal cavity to allow for a deeper draw with greater uniformity rather than stick and stretch with increased built-in stress. Film sticking can reduce film thickness, particularly at the deepest points of the cavity.

Suitable surfactants can include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionic s), polyoxyethylenated amines, quaternary ammonium salts and quaternized polyoxyethylenated amines (cationics), and amine oxides, N-alkylbetaines and sulfobetaines (zwitterionics). Other suitable surfactants include dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, and acetylated esters of fatty acids, and combinations thereof. In various embodiments, the amount of surfactant in the water soluble film can be in a range of about 0.1 wt % to 4.0 wt %, or about 1.0 wt % to 3.0 wt %, or about 1.5 wt % to about 2.5 wt %, or about 0.1 PHR to about 9 PHR, or about 0.1 to about 8 PHR, or about 0.1 to about 6 PHR, or about 0.5 PHR to about 2.9 PHR, or about 0.5 PHR to about 1.5 PHR, or about 1 PHR to about 6 PHR, or about 1.5 PHR to about 5 PHR, or about 2 PHR to about 4 PHR, for example.

A filler can be added in any amount up to the point that the SMR is lower than desired (e.g., when the SMR is less than 4). Without intending to be bound by theory, it is believed that producing a lower SM90 is likely achieved by disruption of the hydrogen bonding in the PVOH; however, a lower SM35 is achieved for the same reason and the lower SM35 is not necessarily desired. Therefore, the reduction in the SM90 should be balanced with the reduction of SM35. Without intending to be bound by theory, it is believed that anti-block agents can reduce the storage modulus in the same way as the filler.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc, mica, stearic acid and metal salts thereof, for example, magnesium stearate. Preferred materials are starches, modified starches and silica. In one type of embodiment, the amount of filler/extender/antiblocking agent/detackifying agent in the water soluble film can be in a range of about 1 wt % to about 6 wt %, or about 1 wt. % to about 4 wt. %, or about 2 wt. % to about 4 wt. %, or about 1 PHR to about 6 PHR, or about 1 PHR to about 4 PHR, or about 2 PHR to about 4 PHR, for example.

An anti-block agent (e.g. $SiO_2$ and/or stearic acid)) can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR.

A suitable median particle size for the anti-block includes a median size in a range of about 3 or about 4 microns to about 11 microns, or about 4 to about 8 microns, or about 5 to about 6 microns, for example 5, 6, 7, 8, or 8 microns. A suitable $SiO_2$ is an untreated synthetic amorphous silica designed for use in aqueous systems.

Processes for solvent casting of PVOH are well-known in the art. For example, in the film-forming process, the polyvinyl alcohol resin(s) and secondary additives are dissolved in a solvent, typically water, metered onto a surface, allowed to substantially dry (or force-dried) to form a cast film, and then the resulting cast film is removed from the casting surface. The process can be performed batch wise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface.

Optionally, the water soluble film can be a free-standing film consisting of one layer or a plurality of like layers.

Thermoformed Articles

Thermoforming a film is the process of heating the film, shaping it (e.g. in a mold), and then allowing the film to cool, whereupon the film will hold its shape, e.g. the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In some embodiments, the film is heated using an infrared light. The film may be heated to a temperature in a range of about 50 to about 150° C., about 50 to about 120° C., about 60 to about 130° C., about 70 to about 120° C., or about 80 to about 100° C. The water soluble film prior to thermoforming can have a thickness in a range of about 5 to about 200 μm, or in a range of about 20 to about 100 μm, or about 60 to about 120 μm, or about 70 to about 100 μm, or about 40 to about 90 μm, or about 50 to about 80 μm, or about 60 to about 65 μm for example 65 μm, 76 μm, 88 μm, or 90 μm.

Thermoforming can be performed by any suitable process, including vacuum thermoforming (by cavity or with a positive mold), pressure thermoforming (e.g. positive gas pressure, optionally with vacuum assist), and mechanical thermoforming (e.g. draped over a positive mold, and optionally with vacuum assist). In one type of embodiment, the thermoforming is vacuum thermoforming. In another type of embodiment, the vacuum thermoforming is by use of a cavity mold. The cavity mold can have a single cavity or can include two or more cavities. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which articles may be made, can have any shape, length, width and depth, depending on the required dimensions. The molds may also vary in size and shape from one to another, if desirable. For example, the volume of the final articles may be about 5 ml to about 300 ml, or about 10 to 150 ml, or about 20 to about 100 ml, and that the mold sizes are adjusted accordingly. In some embodiments, the mold size can be selected such that the final articles have a volume of 25 mL or less, or 20 mL or less, or 15 mL or less, or 10 mL or less, or 5 mL or less, for example, in a range of about 5 mL to about 50 mL, or about 5 mL to about 30 mL.

In the alternative or in addition, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted in a first orientation at the top of the mold, it may be drawn into an appropriate mold into a second orientation, preferably using a vacuum. The distance in the z-direction traveled by the film from the first orientation to the second orientation is the depth of draw. The filling of the molded film can be accomplished by utilizing any suitable means. In some embodiments, the most preferred method will depend on the product form and required speed of filling. In some embodiments, the molded film is filled, with a product to be contained in a resulting pouch, by in-line filling techniques. The filled, open packets are then closed forming the pouches, using a second film, by any suitable method. This may be accomplished while in horizontal position and in continuous, constant motion. The closing may be accomplished by continuously feeding a second film (same or different as the thermoformed film), preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

In some embodiments, a thermoformed article comprising the water soluble film of the disclosure, wherein the film has an initial thickness in a range of 75-90 μm, can be characterized by a depth of draw (the distance in the z-direction traveled by the film from the first orientation to the second orientation during the thermoforming step) of at least 15 mm, or at least 20 mm, or at least 25 mm. In some embodiments, a thermoformed article according to the disclosure comprises a thermoformed cavity comprising walls, corners, and a bottom and can be characterized by a depth of draw of at least 25 mm, and the average thermoformed film thickness at the side walls is at least 29%, or at least 30%, or at least 32%, or at least 40%, or at least 45%, or at least 48%, or at least 50%, or at least 55% of the original film thickness. In some embodiments, a thermoformed article according to the disclosure comprises a thermoformed cavity comprising walls, corners, and a bottom and can be characterized by a depth of draw of at least 25 mm, and the average thermoformed film thickness at the center of the side walls is at least 55%. In some embodiments, a thermoformed article according to the disclosure comprises a thermoformed cavity comprising walls, corners, and a bottom and can be characterized by a depth of draw of at least 25 mm, and the average thermoformed film thickness near the bottom of the side walls is at least 29%. In some embodiments, a thermoformed article according to the disclosure comprises a thermoformed cavity comprising walls, corners, and a bottom and can be characterized by a depth of draw of at least 25 mm, and the thermoformed film thickness at the bottom wall is at least 28%, at least 30%, at least 35%, or at least 37% of the original film thickness. In some embodiments, a thermoformed article of the disclosure comprises a thermoformed cavity comprising walls, corners, and a bottom and can be characterized by a depth of draw of at least 25 mm, and the average thermoformed film thickness in at least two regions selected from corners, side walls, and bottom is at least 40% of the original film thickness. In some embodiments, a thermoformed article according to the disclosure comprises a thermoformed cavity comprising walls, corners, and a bottom and can be characterized by a depth of draw of at least 25 mm, and the thermoformed film thickness at the corner wall is at least 27%, at least 30%, or at least 33% of the original film thickness.

In some embodiments, a thermoformed article comprising the water soluble film of the disclosure can be characterized by a draw ratio of at least 2.5, or at least, 3.0, or at least 3.5. The draw ratio is the ratio of the area of the mold surface to the area of the film prior to drawing. In some embodiments, a thermoformed article according to the disclosure comprises a thermoformed cavity comprising walls, corners, and a bottom, and can be characterized by a draw ratio of at least 3.5, and the average thermoformed film thickness at the side walls is at least 29%, or at least 30%, or at least 32%, or at least 40%, or at least 45%, or at least 48%, or at least 50%, or at least 55% of the original film thickness. In some embodiments, a thermoformed article according to the disclosure comprises a thermoformed cavity comprising walls, corners, and a bottom and can be characterized by a depth of draw ratio of at least 3.5, and the average thermoformed film thickness at the center of the side walls is at least 55%. In some embodiments, a thermoformed article according to the disclosure comprises a thermoformed cavity comprising walls, corners, and a bottom and can be characterized by draw ratio of at least 3.5, and the average thermoformed film thickness near the bottom of the side walls is at least 29%. In some embodiments, a thermoformed article according to the disclosure comprises a thermoformed cavity comprising walls, corners, and a bottom and is characterized by a draw ratio of at least 3.5, and the thermoformed film thickness at the bottom wall is at least 28%, at least 30%, at least 35%, or at least 37% of the original film thickness. In some embodiments, a thermoformed article of the disclosure comprises a thermoformed cavity comprising walls, corners, and a bottom and is characterized by a draw ratio of at least 3.5, and the average thermoformed film thickness in at least two regions selected from corners, side walls, and bottom is at least 40% of the original film thickness. In some embodiments, a thermoformed article according to the disclosure comprises a thermoformed cavity comprising walls, corners, and a bottom and can be characterized by a draw ratio of at least 3.5, and the thermoformed film thickness at the corner wall is at least 27%, at least 30%, or at least 33% of the original film thickness. The draw ratio in relation to the original film thickness is another parameter which describes the extent to which a film becomes thinner, e.g. from the perspective that a thicker film may tolerate higher draw ratios. In some embodiments, a thermoformed article comprising the water soluble film of the disclosure can be characterized by the ratio of the initial film thickness to the depth of draw ratio, e.g. by the depth of draw ratios and film thicknesses described herein and in the examples.

The thermoformed shape (e.g., as dictated by a mold) can, in addition or in the alternative, be characterized by how box-like it is (e.g., compared to a more rounded shape). The boxiness of a mold and resulting thermoformed cavity is dictated by the radius of curvature provided at the intersection of walls, e.g. between individual side walls and between side walls and bottom of a cavity. Thus, in one aspect, the mold can be characterized by having a radius of curvature at any intersection (i.e. a minimum radius of curvature for the mold as a whole) of 10 mm or less, to be considered a more box-like profile. In other embodiments, the radius is 8 mm or less, or in a range of 0.1 mm to 5 mm for example.

The film is useful for creating an article and/or pouch to contain, for example, a detergent composition. The cleaning actives may take any form such as powders, gels, pastes, liquids, tablets or any combination thereof. The film is also useful for any other application in which improved wet handling and low cold water residues are desired. The film forms at least one side wall of the article and/or pouch, optionally the entire article and/or pouch, and preferably an outer surface of the at least one sidewall.

The film described herein can also be used to make an article and/or pouch with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH copolymer described above, as described above, being at least 60%.

The articles and/or pouches of the present disclosure can include at least one sealed compartment. Thus, the articles and/or pouches may comprise a single compartment or multiple compartments. A water-soluble pouch or sachet can be formed from two layers of water-soluble polymer film sealed at an interface, or by a single film that is folded upon itself and sealed. One or both of the films include the PVOH film described above. The films define an interior article and/or pouch container volume which contains any desired composition for release into an aqueous environment.

The pouch container volume is not particularly limiting. The pouch container volume, in one type of embodiment is 25 mL or less. In another embodiment, the volume is less than 25 mL. The pouch container volume, in another type, is less than 50 mL.

The composition for use in the pouch is not particularly limited, for example including any of the variety of cleaning compositions described below. In embodiments comprising multiple compartments, each compartment may contain identical and/or different compositions. In turn, the compositions may take any suitable form including, but not limited to liquid, solid and combinations thereof (e.g. a solid suspended in a liquid). In some embodiments, the pouches comprises a first, second and third compartment, each of which respectively contains a different first, second, and third composition. Liquid detergents are particularly contemplated.

The compartments of multi-compartment articles and/or pouches may be of the same or different size(s) and/or volume(s). The compartments of the present multi-compartment articles and/or pouches can be separate or conjoined in any suitable manner. In some embodiments, the second and/or third and/or subsequent compartments are superimposed on the first compartment. In one embodiment, the third compartment may be superimposed on the second compartment, which is in turn superimposed on the first compartment in a sandwich configuration. Alternatively the second and third compartments may be superimposed on the first compartment. However it is also equally envisaged that the first, second and optionally third and subsequent compartments may be attached to one another in a side by side relationship. The compartments may be packed in a string, each compartment being individually separable by a perforation line. Hence each compartment may be individually torn-off from the remainder of the string by the end-user, for example, so as to pre-treat or post-treat a fabric with a composition from a compartment. In some embodiments, the first compartment may be surrounded by at least the second compartment, for example in a tire-and-rim configuration, or in a pouch-in-a-pouch configuration.

In some embodiments, multi-compartment articles and/or pouches comprise three compartments consisting of a large first compartment and two smaller compartments. The second and third smaller compartments are superimposed on the first larger compartment. The size and geometry of the compartments are chosen such that this arrangement is achievable. The geometry of the compartments may be the same or different. In some embodiments the second and optionally third compartment each has a different geometry and shape as compared to the first compartment. In these embodiments, the second and optionally third compartments are arranged in a design on the first compartment. The design may be decorative, educative, or illustrative, for example to illustrate a concept or instruction, and/or used to indicate origin of the product. In some embodiments, the first compartment is the largest compartment having two large faces sealed around the perimeter, and the second compartment is smaller covering less than about 75%, or less than about 50% of the surface area of one face of the first compartment. In embodiments in which there is a third compartment, the aforementioned structure may be the same but the second and third compartments cover less than about 60%, or less than about 50%, or less than about 45% of the surface area of one face of the first compartment.

The articles and/or pouches of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the article and/or packet may be made from one or more films such that any given packet compartment may comprise walls made from a single film or multiple films having differing compositions. In one embodiment, a multi-compartment article and/or pouch comprises at least three walls: an outer upper wall; an outer lower wall; and a partitioning wall. The outer upper wall and the outer lower wall are generally opposing and form the exterior of the article and/or pouch. The partitioning wall is interior to the article and/or pouch and is secured to the generally opposing outer walls along a seal line. The partitioning wall separates the interior of the multi-compartment article and/or pouch into at least a first compartment and a second compartment.

In one embodiment, the article and/or pouch comprises a first and a second sealed compartment. The second compartment is in a generally superposed relationship with the first sealed compartment such that the second sealed compartment and the first sealed compartment share a partitioning wall interior to the article and/or pouch.

In one embodiment, the article and/or pouch comprising a first and a second compartment further comprises a third sealed compartment. The third sealed compartment is in a generally superposed relationship with the first sealed compartment such that the third sealed compartment and the first sealed compartment share a partitioning wall interior to the article and/or pouch.

In some embodiments, the first composition and the second composition are selected from one of the following combinations: liquid, liquid; liquid, powder; powder, powder; liquid, gel; liquid, paste; powder, gel; powder; paste; gel; paste; gel, gel; paste, paste.

In some embodiments, the first, second and third compositions are selected from one of the following combinations: solid, liquid, liquid and liquid, liquid, liquid. Other combinations may include gels or pastes in similar combinations.

In one embodiment, the single compartment or plurality of sealed compartments contains a composition. The plurality of compartments may each contain the same or a different composition. The composition is selected from a liquid, solid or combination thereof.

In one embodiment, the composition may be selected from the group of liquid light duty and liquid heavy duty liquid detergent compositions, powdered detergent compositions, dish detergent for hand washing and/or machine washing; hard surface cleaning compositions, fabric enhancers, detergent gels commonly used for laundry, and bleach and laundry additives, shampoos, and body washes.

The formed articles and/or pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, conjoined pouches may or may not be separated by cutting. Alternatively, the compartments can be made separately.

In some embodiments, articles and/or pouches may be made according to a process comprising the steps of: a) forming a first compartment (as described above); b) forming a recess within some or all of the closed compartment formed in step (a), to generate a second molded compartment superposed above the first compartment; c) filling and closing the second compartments by means of a third film; d) sealing the first, second and third films; and e) cutting the films to produce a multi-compartment article and/or pouch. The recess formed in step (b) may be achieved by applying a vacuum to the compartment prepared in step (a).

In some embodiments, second, and/or third compartment(s) can be made in a separate step and then combined with the first compartment as described in European Patent Application Number 08101442.5 or WO 2009/152031.

In some embodiments, articles and/or pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment article and/or pouch.

The first and second forming machines may be selected based on their suitability to perform the above process. In some embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment articles and/or pouches incorporating a number of different or distinctive compositions and/or different or distinctive liquid, gel or paste compositions.

In some embodiments, the film and/or article and/or pouch is sprayed or dusted with a suitable material, such as an active agent, a lubricant, an aversive agent, or mixtures thereof. In some embodiments, the film and/or pouch is printed upon, for example, with an ink and/or an active agent.

Article and/or Pouch Contents

The present articles and/or pouches may contain various compositions, for example household care compositions. A multi-compartment article and/or pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

Multi-compartment articles and/or pouches may be utilized to keep compositions containing incompatible ingredients (e.g., bleach and enzymes) physically separated or partitioned from each other. It is believed that such partitioning may expand the useful life and/or decrease physical instability of such ingredients. Additionally or alternatively, such partitioning may provide aesthetic benefits as described in European Patent Application Number 09161692.0.

Non-limiting examples of useful compositions (e.g., household care compositions) include light duty and heavy duty liquid detergent compositions, hard surface cleaning compositions, detergent gels commonly used for laundry, bleach and laundry additives, fabric enhancer compositions (such as fabric softeners), shampoos, body washes, and other personal care compositions. Compositions of use in the present articles and/or pouches may take the form of a liquid, solid or a powder. Liquid compositions may comprise a solid. Solids may include powder or agglomerates, such as micro-capsules, beads, noodles or one or more pearlized balls or mixtures thereof. Such a solid element may provide a technical benefit, through the wash or as a pre-treat, delayed or sequential release component; additionally or alternatively, it may provide an aesthetic effect.

Storage Modulus Dynamic Mechanical Analyzer (DMA)

Film samples were equilibrated and stored in a controlled environment at 23° C. and 50% relative humidity (RH). The storage modulus, loss modulus, and tan delta (E"/E') were determined by DMA on a TA Instrument RSA-G2 in tensile in a low humidity air environment. Testing samples were cut to the size of 50 mm long by 9 mm wide. Measurements may be done according to ASTM E2254-13. For purposes of clarity, the following settings may be used:

Compensate for modulus: Off
Axial Force>Dynamic Force 10.0%
Minimum axial force 3.0 g
Max gap change up 10.0 mm
Max gap change down 1.0 mm
Start temperature 25° C.
Ramp rate 10.0° C./min
End temperature 150° C.
Sampling rate 1 pts/s
Strain % 0.1%

A film according to the disclosure, in one type of preferred class of embodiments, is characterized by a maximum tan delta of at least 0.4, or in another embodiment greater than 0.4, or in other embodiments at least 0.45, or at least 0.50, or at least 0.53. Optionally, the maximum tan delta can be up to 10, or up to 5, or up to 1. Thus, for example, the maximum tan delta can be in a range of 0.4 to 1, or greater than 0.4 to 1, 0.45 to 1, or 0.5 to 1, or 0.53 to 1. Further optionally, the maximum tan delta falls with a range of about 5° C. to 50° C., or 10° C. to 40° C., or 10° C. to 35° C., or 10° C. to 30° C.

Types of embodiments of the films contemplated herein are described in the following numbered paragraphs 1 to 20.

1. A water soluble film suitable for thermoforming deep-drawn profiles, the film comprising a mixture of a water soluble polyvinyl alcohol resin and a plasticizer, wherein the water soluble polyvinyl alcohol resin comprises a polyvinyl acetate co-maleate copolymer and the water soluble polyvinyl alcohol resin has a viscosity in a range of about 14 cP to about 20 cP.
2. The water soluble film of paragraph 1, wherein the water soluble polyvinyl alcohol resin comprises a blend of the polyvinyl acetate co-maleate copolymer and a second polyvinyl alcohol polymer.

3. The water soluble film of paragraph 2, wherein the second polyvinyl alcohol polymer is selected from the group consisting of polyvinyl acetate co-methyl acrylate copolymers, polyvinyl alcohol homopolymers, and mixtures thereof.
4. The water soluble film of any one of the preceding paragraphs, wherein the polyvinyl acetate co-maleate copolymer includes at least 2 mol % maleate modification.
5. The water soluble film of any one of the preceding paragraphs, wherein the PVOH resin comprises at least 9 mol % total non-hydroxyl pendant groups.
6. The water soluble film of any one of the preceding paragraphs, wherein the plasticizer is selected from the group consisting of glycerol, diglycerol, propylene glycol, ethylene glycol, diethylene glycol, polyethylene glycols up to MW 400, sorbitol, 2-methyl-1,3-propanediol, trimethylolpropane (TMP), polyether polyols, and combinations of the foregoing.
7. The water soluble film of paragraph 6, wherein the plasticizer is selected from the group consisting of glycerol, propylene glycol, sorbitol, 2-methyl-1,3-propanediol, and combinations of the foregoing.
8. The water soluble film of any one of the preceding paragraphs, further comprising a filler, a surfactant, an anti-block agent or combinations of the foregoing.
9. A thermoformed article comprising the water soluble film of any one of the preceding paragraphs, wherein the article is characterized by a draw ratio of at least 2.5.
10. The thermoformed article of paragraph 9, wherein the article comprises a thermoformed cavity comprising walls, corners, and a bottom, the article is characterized by a draw ratio of at least 3.5, and the average thermoformed film thickness near the bottom of the side walls is at least 29% of the original film thickness.
11. The thermoformed article of paragraph 9, wherein the article comprises a thermoformed cavity comprising walls, corners, and a bottom, the article is characterized by a draw ratio of at least 3.5, and the thermoformed film thickness at the bottom wall is at least 28% of the original film thickness.
12. The thermoformed article of paragraph 9, wherein the article comprises a thermoformed cavity comprising walls, corners, and a bottom, the article is characterized by a draw ratio of at least 3.5, and the thermoformed film thickness at the corners is at least 27% of the original film thickness.
13. The thermoformed article of paragraph 9, wherein the article is vacuum-formed.
14. A thermoformed pouch comprising the film of any one of the preceding paragraphs.
15. A method of making a shape from a water soluble film, comprising thermoforming the water soluble film of any one of the preceding paragraphs.
16. The method of paragraph 15, comprising vacuum thermoforming the water soluble film.
17. The method of paragraph 15 or 16, wherein the water soluble film is heated to a temperature in a range of about 50° C. to about 150° C.
18. The method of any one of paragraphs 15 to 17, wherein the thickness of the film prior to thermoforming is about 60 to about 120 microns thick.
19. The method of any one of paragraphs 15 to 18, wherein thermoforming comprises a thermoforming mold comprising at least two cavities.
20. A thermoformed article comprising the water soluble film of any one of the preceding paragraphs, wherein the article comprises at least two thermoformed cavities, each cavity comprising walls, corners, and a bottom.

The water soluble films in accordance with the disclosure can be better understood in light of the following examples, which are merely intended to illustrate the water soluble films and water soluble articles and are not meant to limit the scope thereof in any way.

EXAMPLES

In the following examples, the PVOH resins PVOH 1-9 have the properties described in Table 1 below.

TABLE 1

| PVOH | Description | Viscosity | Mole % anionic modification | Mole % total non-hydroxyl pendant groups |
|---|---|---|---|---|
| PVOH-1 | Monomethyl maleate co-polymer | 16 cP | 4.0 mole % | 16 mole % |
| PVOH-2 | Monomethyl maleate co-polymer | 16 cP | 4.0 mole % | 16 mole % |
| PVOH-3 | Monomethyl maleate co-polymer | 23 | 1.8 mole % | 12 mole % |
| PVOH-4 | 2-acrylamido-2-methylpropane sulfonic acid (AMPS) copolymer | 12 cP | 4.0 mole % | 6 mole % |
| PVOH-5 | Methyl acrylate co-polymer | 20 cP | 5 mole % | 3.5 mole % |
| PVOH-6 | Polyvinyl alcohol homopolymer | 23 cP | No anionic modification | 12.5 mole % |
| PVOH-7[1] | Monomethyl maleate/polyvinyl acetate copolymer[2] | n/a | n/a | n/a |
| PVOH-8 | Monomethyl maleate co-polymer | 16 cP | 4.0 mole % | 16 mole % |
| PVOH-9 | Polyvinyl alcohol homopolymer | 32 cP | n/a | 12.5 |

[1]Commercially available film from ex Aicello as GS/GA.
[2]Estimation

Descriptions of films according to Examples 1-21 are provided in Table 2 as examples of various ranges and concentrations of plasticizers, surfactants, fillers and anti-block agents. The examples are provided in a variety of PVOH copolymer resin formulations and are applicable to alternative formulations consistent with the disclosure herein. Non-resin components are described in units of PHR.

Also included in Table 2 is the measurement of tan delta (E"/E') for each film, which is related to a secondary thermodynamic transition at a temperature $T_t$ (in a range between 10° C. and 30° C., as shown in the table) above which there is additional chain/polymer mobility, possibly a chain in hydrogen bonding, which enables or facilitates better thermoforming. Tan delta is the ratio of loss to the storage and is sometimes referred to as damping, and is a measure of the energy dissipation of a material. It can indicate the extent to which a material will be good at absorbing energy, and improved thermoforming.

TABLE 2

| Ex. | Resin/Viscosity | Plasticizer | Surfactant | Filler | Anti-block | tan (delta) ($T_t$) |
|---|---|---|---|---|---|---|
| 1. | PVOH-1/16 cP | 24.76 PHR | 0.63 PHR | 2.35 PHR[3] | 0 PHR | 0.4564 (25° C.) |
| 2. | PVOH-2/16 cP | 24.38 PHR | 3.03 PHR | 2.36 PHR | 1.34 PHR | 0.4064 (25° C.) |
| 3. | PVOH-5/20 cP | 41.84 PHR | 2.85 PHR | 2.92 PHR | 1.78 PHR | 0.4237 (10° C.) |
| 4. | PVOH-7[1] | n/a | n/a | n/a | n/a | 0.3749 (30° C.) |
| 5. | PVOH-3/23 cP | 24.37 PHR | 0.63 PHR | 2.36 PHR | 1.34 PHR | 0.3747 (25° C.) |
| 6. | PVOH-3/23 cP | 24.35 PHR | 0.63 PHR | 2.36 PHR | 0 PHR | 0.3405 (20° C.) |
| 7. | PVOH-4/12 cP | 24.37 PHR | 0.63 PHR | 2.36 PHR | 1.34 PHR | |
| 8. | PVOH-4/12 cP | 30.53 PHR | 2.02 PHR | 2.72 PHR | 3.26 PHR | |
| 9. | PVOH-5/20 cP | 31.58 PHR | 0.75 PHR | 2.69 PHR | 0.28 PHR | |
| 10. | PVOH-6/23 cP | 27.00 PHR | 0.23 PHR | 0 PHR | 2.08 PHR | |
| 11. | PVOH-8/16 cP | 24.53 PHR | 0.65 PHR | 2.34 PHR[4] | 0 PHR | |
| 12. | PVOH-8/16 P | 24.35 PHR | 0.63 PHR | 2.34 PHR[5] | 0 PHR | |
| 13. | 80 wt. % PVOH-8; 20 wt % PVOH-5/16.7 cP | 43.24 PHR | 2.91 PHR | 2.99 PHR | 1.82 PHR | |
| 14. | 60 wt. % PVOH-8; 40 wt % PVOH-5/17.5 cP | 42.88 PHR | 2.89 PHR | 2.96 PHR | 1.8 PHR | |
| 15. | 50 wt. % PVOH-8; 50 wt % PVOH-5/17.9 cP | 42.7 PHR | 2.88 PHR | 2.95 PHR | 1.8 PHR | |
| 16. | 80 wt. % PVOH-8; 20 wt % PVOH-9/18.4 cP | 24.35 PHR | 0.63 PHR | 2.35 PHR | 0 PHR | 0.4298 (25° C.) |
| 17. | 80 wt. % PVOH-8; 20 wt % PVOH-9/18.4 cP | 40.64 PHR | 2.85 PHR | 0 PHR | 1.78 PHR | 0.5288 (15° C.) |
| 18. | 70 wt. % PVOH-8; 30 wt % PVOH-9/19.6 cP | 24.35 PHR | 0.63 PHR | 2.35 PHR | 0 PHR | 0.4079 (25° C.) |
| 19. | 70 wt. % PVOH-8; 30 wt % PVOH-9/19.6 cP | 40.64 PHR | 2.85 PHR | 0 PHR | 1.78 PHR | 0.5310 (15° C.) |
| 20. | PVOH-3/23 cP | 24.35 PHR | 0.63 PHR | 2.35 PHR | 0 PHR | |
| 21. | PVOH-5/20 cP | 42.32 PHR | 2.85 PHR | 2.92 PHR | 1.78 PHR | |

[1]Commercially available film ex Aicello as GS/GA

[3]Unless otherwise noted, the filler is a hydroxyethyl modified starch having an amylose content of approximately 25%.

[4]Unmodified starch having an amylose content of approximately 50%.

[5]Unmodified starch having an amylose content of approximately 25%.

Examples 1-21

Formability

The thickness of the films according to Examples 1-6, 8, 9, and 11-21 as described in Table 2 were measured before and after thermoforming to quantify the formability of the films. Films having an area of 1600 mm² were thermoformed on a lab-scale Cloud machine (Model: PVA Sample; S/N 3657). The film was heated by 500° F. (about 260° C.) IR lamps for 10 seconds. The film temperature was approximately 80° C. After pre-heating, the film was pulled into the cavities by vacuum (vacuum level about −24 inches Hg (about −61 cm Hg)). Nine cavities were used, all box-like in shape with rounded corners. Three of cavities had a depth of 15-mm, three had a depth of 20-mm, and three had a depth of 25-mm. The areas of the molds were 4000 mm², 4800 mm² and 5600 mm², respectively After thermoforming, the film was pulled out of the cavities. Film thicknesses were measured with a Fowler Electronic Micrometer Model #54-860-777. Film thicknesses were measured at the four walls (at the center of the film and/or near the bottom wall), the four corners, and at the bottom of the cavity. The measurements are summarized in Tables 3 to 6.

TABLE 3

| Corner Thickness (microns) | | | | | |
|---|---|---|---|---|---|
| Example | Starting thickness | 15-mm Cavity Draw ratio: 2.5 | 20-mm Cavity Draw ratio: 3 | 25-mm Cavity Draw ratio: 3.5 | Percent original thickness[1] |
| 17 | 76 | 52 | 39 | 27 | 36% |
| 16 | 76 | 46 | 43 | 26 | 34% |
| 1 | 88 | 46 | 39 | 29 | 33% |
| 18 | 76 | 48 | 32 | 24 | 32% |
| 4 | 75 | 41 | 28 | 24 | 32% |
| 12 | 76 | 47 | 34 | 24 | 31% |
| 11 | 76 | 49 | 34 | 24 | 31% |
| 21 | 88 | 60 | 37 | 27 | 31% |
| 3 | 90 | 48 | 35 | 28 | 31% |
| 14 | 88 | 54 | 32 | 27 | 31% |
| 19 | 88 | 57 | 42 | 25 | 29% |
| 8 | 90 | 44 | 32 | 25 | 28% |
| 9 | 65 | 31 | 24 | 18 | 28% |
| 2 | 90 | 42 | 32 | 24 | 27% |
| 13 | 88 | 57 | 38 | 23 | 27% |
| 15 | 88 | 55 | 37 | 23 | 26% |
| 6 | 90 | 39 | 29 | 21 | 23% |

TABLE 3-continued

| Corner Thickness (microns) | | | | | |
|---|---|---|---|---|---|
| Example | Starting thickness | 15-mm Cavity Draw ratio: 2.5 | 20-mm Cavity Draw ratio: 3 | 25-mm Cavity Draw ratio: 3.5 | Percent original thickness[1] |
| 20 | 76 | 44 | 27 | 17 | 22% |
| 5 | 88 | 42 | 30 | 19 | 22% |

[1]Percentage = (thickness after forming into 25-mm cavity)/(starting thickness) × 100

TABLE 4

| Side Wall Thickness, Near Center of Side Wall (microns) | | | | | |
|---|---|---|---|---|---|
| Example | Starting thickness | 15-mm Cavity Draw ratio: 2.5 | 20-mm Cavity Draw ratio: 3 | 25-mm Cavity Draw ratio: 3.5 | Percent original thickness[1] |
| 1 | 88 | 64 | 58 | 51 | 58% |
| 3 | 90 | 69 | 58 | 48 | 53% |
| 8 | 90 | 64 | 57 | 46 | 51% |
| 6 | 90 | 61 | 51 | 44 | 49% |
| 5 | 88 | 65 | 56 | 42 | 48% |
| 4 | 75 | 58 | 54 | 34 | 45% |
| 9 | 65 | 46 | 35 | 29 | 45% |
| 2 | 90 | 60 | 53 | 40 | 44% |
| 17 | 76 | 57 | 44 | 30 | 40% |
| 16 | 76 | 51 | 44 | 28 | 37% |
| 18 | 76 | 50 | 36 | 28 | 37% |
| 19 | 88 | 61 | 50 | 31 | 35% |

[1]Percentage = (thickness after forming into 25-mm cavity)/(starting thickness) × 100

TABLE 5

| Bottom Thickness (microns) | | | | | |
|---|---|---|---|---|---|
| Example | Starting thickness | 15-mm Cavity Draw ratio: 2.5 | 20-mm Cavity Draw Ratio: 3 | 25-mm Cavity Draw ratio: 3.5 | Percent original thickness[1] |
| 1 | 88 | 62 | 56 | 39 | 44% |
| 12 | 76 | 54 | 41 | 30 | 39% |
| 2 | 90 | 58 | 43 | 33 | 37% |
| 3 | 90 | 62 | 47 | 32 | 36% |
| 17 | 76 | 57 | 41 | 27 | 36% |
| 11 | 76 | 54 | 40 | 26 | 35% |
| 16 | 76 | 51 | 39 | 26 | 34% |
| 18 | 76 | 52 | 34 | 25 | 33% |
| 8 | 90 | 58 | 42 | 30 | 33% |
| 19 | 88 | 61 | 46 | 29 | 33% |
| 21 | 88 | 62 | 40 | 29 | 32% |
| 4 | 75 | 49 | 36 | 24 | 32% |
| 14 | 88 | 53 | 35 | 27 | 31% |
| 9 | 65 | 40 | 26 | 20 | 31% |
| 15 | 88 | 59 | 41 | 25 | 29% |
| 13 | 88 | 64 | 43 | 25 | 28% |
| 6 | 90 | 53 | 38 | 24 | 27% |
| 5 | 88 | 57 | 40 | 23 | 26% |
| 20 | 76 | 51 | 30 | 19 | 25% |

[1]Percentage = (thickness after forming into 25-mm cavity)/(starting thickness) × 100

FIG. 1 shows the data of Tables 3-5 in graphical format.

TABLE 6

| Side Wall Thickness (microns) - Side Wall Near Bottom Edge | | | | | |
|---|---|---|---|---|---|
| Example | Starting thickness | 15-mm Cavity Draw ratio: 2.5 | 20-mm Cavity Draw Ratio: 3 | 25-mm Cavity Draw ratio: 3.5 | Percent original thickness[1] |
| 12 | 76 | 53 | 40 | 30 | 39% |
| 17 | 76 | 57 | 44 | 30 | 36% |
| 11 | 76 | 54 | 39 | 27 | 36% |
| 16 | 76 | 51 | 44 | 28 | 34% |
| 14 | 88 | 56 | 37 | 29 | 33% |
| 21 | 88 | 64 | 43 | 29 | 33% |
| 18 | 76 | 50 | 36 | 28 | 32% |
| 19 | 88 | 61 | 50 | 31 | 29% |
| 15 | 88 | 61 | 42 | 25 | 29% |
| 13 | 88 | 65 | 44 | 25 | 29% |
| 20 | 76 | 50 | 32 | 20 | 27% |

[1]Percentage = (thickness after forming into 25-mm cavity)/(starting thickness) × 100

Acceptable films can be characterized by an average thermoformed film thickness at the bottom wall of at least 37% of the original film thickness when the depth of draw is at least 25 mm or the draw ratio is at least 3.5, for example, Examples 1 and 2. Alternatively or additionally, acceptable films including a polyvinyl acetate co-maleate copolymer can be characterized by an average thermoformed film thickness at the bottom wall of at least 28% of the original film thickness. Alternatively or additionally, acceptable films can be characterized by an average thermoformed film thickness at the center of the side walls of at least 55% of the original film thickness. Alternatively or additionally, acceptable films including a polyvinyl acetate co-maleate copolymer can be characterized by an average thermoformed film thickness near the bottom of the side wall of at least 29%. Alternatively or additionally, acceptable films including a polyvinyl acetate co-maleate copolymer can be characterized by an average thermoformed film thickness at the corner of at least 27%. Alternatively or additionally, acceptable films can be characterized by an average thermoformed film thickness in at least two regions selected from corners, side walls, and bottom of at least 40% of the original film thickness when the depth of draw is at least 25 mm or the draw ratio is at least 3.5.

Comparative data in Table 4 and Table 6 also demonstrates that the thickness of the side wall may vary throughout the length of the wall. As shown above, the thickness of the film decreases toward the bottom of the side wall relative to the center of the side wall. The smaller the difference in the film thicknesses between the center of the side wall values and the bottom of the side wall values, the more uniform the film demonstrating good film formability.

Storage Modulus

Figure 2:
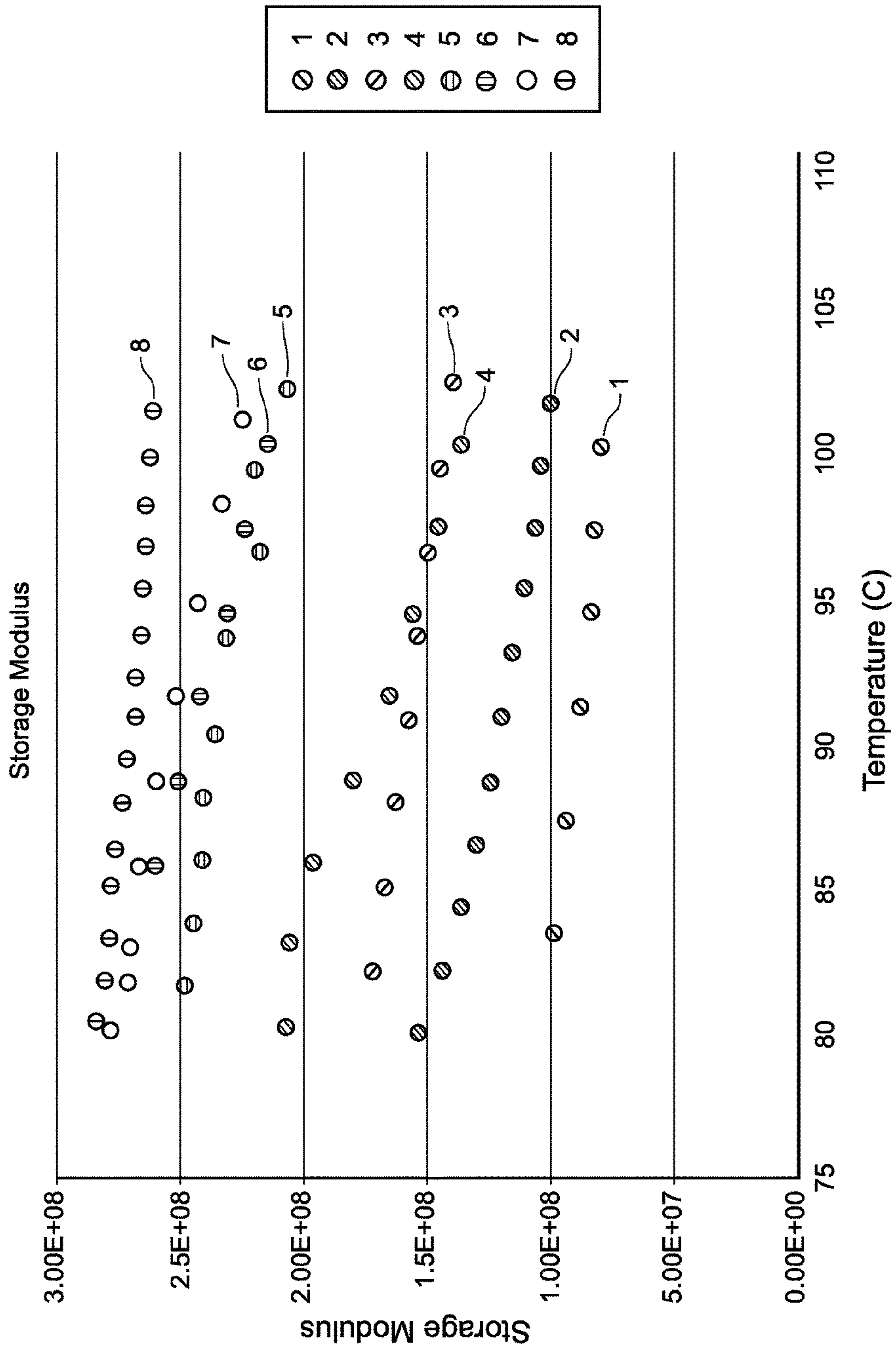
FIG. 2 shows a graphical representation of the storage modulus vs. temperature for various water soluble films.

The storage moduli of films according to Examples 1-8 as described in Table 2 were determined at various temperatures using a Dynamic Mechanical Analyzer, as described above. FIG. 2 shows a plot of the storage modulus against temperature for temperatures in the range of 80° C. to 100° C. As shown in FIG. 2, Examples 1 and 2 have a storage modulus at 90° C. of $1.5\times10^{8}$ or less.

TABLE 6

| Film | Performance Ranking | Commercially Acceptable | Storage Modulus 35° C.[1] | Storage Modulus 90° C. | SMR |
|---|---|---|---|---|---|
| 2 | Best | Yes | $7.4 \times 10^8$ | $1.25 \times 10^8$ | 5.91 |
| 3 | Middle | Marginal | $2.9 \times 10^8$ | $1.59 \times 10^8$ | 1.82 |
| 4 | Middle | Marginal | $5.5 \times 10^8$ | $1.76 \times 10^8$ | 3.15 |
| 5 | Poorest | No | $5.3 \times 10^8$ | $2.35 \times 10^8$ | 2.27 |

[1]Note the Storage Modulus of all of these films at 35° C. is higher than the maximum preferred value of $10^8$. Storage modulus increases (or at least stays constant) with decreasing temperature.

TABLE 7

| Storage Modulus Ratio | | | |
|---|---|---|---|
| Example | SM35 | SM90 | SM35/SM90 |
| 1 | 4.33E+08 | 9.12E+07 | 4.75 |
| 2 | 7.37E+08 | 1.25E+08 | 5.91 |
| 3 | 2.91E+08 | 1.60E+08 | 1.82 |
| 4 | 5.51E+08 | 1.75E+08 | 3.15 |
| 5 | 5.34E+08 | 2.35E+08 | 2.27 |
| 6 | 1.04E+09 | 2.47E+08 | 4.19 |
| 7 | 5.41E+08 | 2.55E+08 | 2.12 |
| 8 | 6.72E+08 | 2.72E+08 | 2.47 |
| 9 | 1.05E+09 | 2.68E+08 | 3.91 |

The storage modulus at 90° C. was calculated from linear regression of storage modulus values from 80° C. to 100° C. The storage modulus at 35° C. was calculated from linear regression of storage modulus values from the first data point above 30° C. to the last point below 40° C. Visual inspection of thermoformed films identified commercially acceptable films having good formability wherein when the film was drawn down the film followed the form of the cavity smoothly and uniformly, for example, Example 2 in Tables 6 and 7. Marginally acceptable films, Examples 3 and 4, had folding in the surface such that the film was not smooth along the bottom of the cavity. Non-commercially acceptable films, for example, Example 5 in Tables 6 and 7, had poor formability and did not draw completely down into the cavity.

Acceptable films can be characterized by a ratio of the storage modulus at 35° C. to the storage modulus at 90° C. (SMR) of at least 4.5, for example, Examples 1 and 2 in Table 7.

The foregoing description is given for clearness of understanding only, and no unnecessary limitations should be understood therefrom, as modifications within the scope of the invention may be apparent to those having ordinary skill in the art.

Although processes have been described with reference to particular embodiments, a person of ordinary skill in the art will readily appreciate that other ways of performing the acts associated with the methods may be used. For example, the order of various of the steps may be changed without departing from the scope or spirit of the method, unless described otherwise. In addition, some of the individual steps can be combined, omitted, or further subdivided into additional steps.

All patents, publications and references cited herein are hereby fully incorporated by reference. In case of conflict between the present disclosure and incorporated patents, publications and references, the present disclosure should control.

What is claimed:

1. A water-soluble film suitable for forming deep-drawn thermoformed profiles, the water-soluble film consisting of:

a polyvinyl acetate co-maleate copolymer having a degree of modification up to about 5 mol %, a non-hydroxyl pendant group content in a range of about 14 mol % to about 18 mol %, and a viscosity in a range of about 14 cP to about 18 cP, wherein the polyvinyl acetate-co-maleate copolymer is provided in an amount of about 65% to about 85% by weight, based on the total weight of the film;

one or more surfactants;

one or more plasticizers;

one or more fillers selected from the group consisting of starches, modified starches, crosslinked polyvinylpyrrolidone, crosslinked cellulose, microcrystalline cellulose, silica, metallic oxides, calcium carbonate, talc, mica, stearic acid and metal salts thereof; and optionally, one or more anti-block agents, wherein:

the film is free of dipropylene glycol, and the film has a storage modulus ratio (SMR) in a range of 4.5 to 6, the storage modulus ratio of the film being defined as the ratio of the storage modulus of the film at 35° C. to the storage modulus of the film at 90° C.

2. The water soluble film of claim 1, wherein the polyvinyl acetate co-maleate copolymer has a degree of maleate modification in a range of about 2 mol % to about 5 mol %.

3. The water soluble film of claim 2, wherein:

the one or more surfactants are selected from the group consisting of nonionic surfactants, cationic surfactants, anionic surfactants, zwitterionic surfactants, and combinations thereof;

the one or more plasticizers are selected from the group consisting of glycerol, diglycerol, propylene glycol, ethylene glycol, diethylene glycol, polyethylene glycols up to MW 400, sorbitol, 2-methyl-1,3-propanediol, trimethylolpropane (TMP), polyether polyols, and combinations thereof; and the one or more fillers and the one or more anti-block agents, when present, are selected from the group consisting of starches, modified starches, crosslinked polyvinylpyrrolidone, crosslinked cellulose, microcrystalline cellulose, silica, metallic oxides, calcium carbonate, talc, mica, stearic acid and metal salts thereof, and combinations thereof.

4. The water-soluble film of claim 3, wherein the one or more surfactants are selected from the group consisting of polyoxyethylenated polyoxypropylene glycols, alcohol ethoxylates, alkylphenol ethoxylates, tertiary acetylenic glycols, alkanolamides, polyoxyethylenated amines, quaternary ammonium salts, quaternized polyoxyethylenated amines, amine oxides, N-alkylbetaines, sulfobetaines, dioctyl sodium sulfosuccinate, lactylated fatty acid esters of glycerol and propylene glycol, lactylic esters of fatty acids, sodium alkyl sulfates, polysorbate 20, polysorbate 60, polysorbate 65, polysorbate 80, lecithin, acetylated fatty acid esters of glycerol and propylene glycol, acetylated esters of fatty acids, and combinations thereof.

5. The water soluble film of claim 1, wherein the one or more plasticizers are selected from the group consisting of glycerol, diglycerol, propylene glycol, ethylene glycol, diethylene glycol, polyethylene glycols up to MW 400, sorbitol, 2-methyl-1,3-propanediol, trimethylolpropane (TMP), polyether polyols, and combinations of the foregoing.

6. The water soluble film of claim 1, wherein the one or more plasticizers are selected from the group consisting of glycerol, propylene glycol, sorbitol, 2-methyl-1,3-propanediol, and combinations of the foregoing.

7. The water soluble film of claim 1, further comprising the one or more anti-block agents.

8. The water-soluble film of claim 1, wherein the polyvinyl acetate co-maleate copolymer has a storage modulus at 90° C. of about $1.5\times10^8$ Pa or less.

9. The water-soluble film of claim 1, wherein the one or more surfactants are provided in an amount of about 0.5 parts per hundred parts resin (PHR) to about 4 PHR.

10. A thermoformed article comprising the water soluble film of claim 1, wherein the article is characterized by a draw ratio of at least 2.5.

11. The thermoformed article of claim 10, wherein the article comprises a thermoformed cavity comprising walls, corners, and a bottom, the article is characterized by a draw ratio of at least 3.5, and the average thermoformed film thickness near the bottom of the side walls is at least 29% of a thickness of the water soluble film before undergoing thermoforming.

12. The thermoformed article of claim 10, wherein the article comprises a thermoformed cavity comprising walls, corners, and a bottom, the article is characterized by a draw ratio of at least 3.5, and the thermoformed film thickness at the bottom wall is at least 28% of a thickness of the water soluble film before undergoing thermoforming.

13. The thermoformed article of claim 10, wherein the article comprises a thermoformed cavity comprising walls, corners, and a bottom, the article is characterized by a draw ratio of at least 3.5, and the thermoformed film thickness at the corners is at least 27% of a thickness of the water soluble film before undergoing thermoforming.

14. The thermoformed article of claim 10, wherein the article is vacuum-formed.

15. A thermoformed pouch comprising the film of claim 1.

16. A thermoformed article comprising the water soluble film of claim 1, wherein the article comprises at least two thermoformed cavities, each cavity comprising walls, corners, and a bottom.

17. A method of making a shape from a water soluble film, comprising thermoforming the water soluble film of claim 1.

18. The method of claim 17, comprising vacuum thermoforming the water soluble film.

19. The method of claim 17, wherein the water soluble film is heated to a temperature in a range of about 50° C. to about 150° C.

20. The method of claim 17, wherein the thickness of the film prior to thermoforming is about 60 to about 120 microns thick.

21. The method of claim 17, wherein thermoforming comprises a thermoforming mold comprising at least two cavities.

* * * * *